(12) United States Patent
Suzuki et al.

(10) Patent No.: US 6,299,947 B1
(45) Date of Patent: Oct. 9, 2001

(54) METHOD OF FORMING A MAGNETIC HARD DISK WITH ELLIPTICAL SHAPED LASER BUMPS

(75) Inventors: Shoji Suzuki, San Jose; David Treves, Palo Alto; David Vigdor Salamon, San Jose; Dan Frusescu, Santa Clara, all of CA (US); Rony Thomas, Kelachandra Chingavanam (IN)

(73) Assignee: Komag, Inc., San Jose, CA (US)

( * ) Notice: Subject to any disclaimer, the term of this patent is extended or adjusted under 35 U.S.C. 154(b) by 0 days.

(21) Appl. No.: 09/234,448

(22) Filed: Jan. 20, 1999

(51) Int. Cl.$^7$ .................................................. B05D 3/00
(52) U.S. Cl. ...................... 427/555; 427/129; 427/130; 427/131; 427/132; 427/264; 427/265; 427/270; 427/275; 427/276; 427/287; 427/314; 427/318; 427/320; 427/327; 427/328; 427/404; 427/405; 427/556; 427/595; 427/596
(58) Field of Search ................................. 427/131, 132, 427/130, 129, 555, 556, 595, 596, 264, 265, 270, 275, 276, 287, 314, 318, 320, 327, 328, 404, 405

(56) References Cited

U.S. PATENT DOCUMENTS

| | | |
|---|---|---|
| 5,062,021 | 10/1991 | Ranjan et al. .................. 360/135 |
| 5,108,781 | 4/1992 | Ranjan et al. .................. 427/53.1 |
| 5,236,763 | 8/1993 | Luthi . |
| 5,528,922 | 6/1996 | Baumgart et al. . |
| 5,631,408 | * 5/1997 | Baumgart et al. . |
| 6,146,736 | 11/2000 | Liu et al. .................. 428/65.3 |

FOREIGN PATENT DOCUMENTS 1-180351   7/1996   (JP) .

OTHER PUBLICATIONS

Patent application 09/216,008, filed Dec. 17, 1998, entitled Continuous Texture Features for a Disk Substrate, filed by Li–Ju Lin et al.

Bhushan, et al., "Roughness–Induced Shear– and Squeeze–Film Effects in Magnetic Recording—Part I: Analysis", Transactions of the ASME Journal of Tribology, 1988, vol. 117, p. 220–227 (No Month Available).

* cited by examiner

Primary Examiner—Bernhard Pianalto

(57) ABSTRACT

A method in accordance with our invention for providing texture bumps on a substrate comprises the step of forming elliptical ridge-shaped bumps on the substrate. In one embodiment, substrate is used in the manufacture of a magnetic disk used in a disk drive. The elliptical bumps cause less vibration of the read-write head than circular bumps. The elliptical bumps also provide reduced friction between the disk and a read-write head during use.

39 Claims, 6 Drawing Sheets

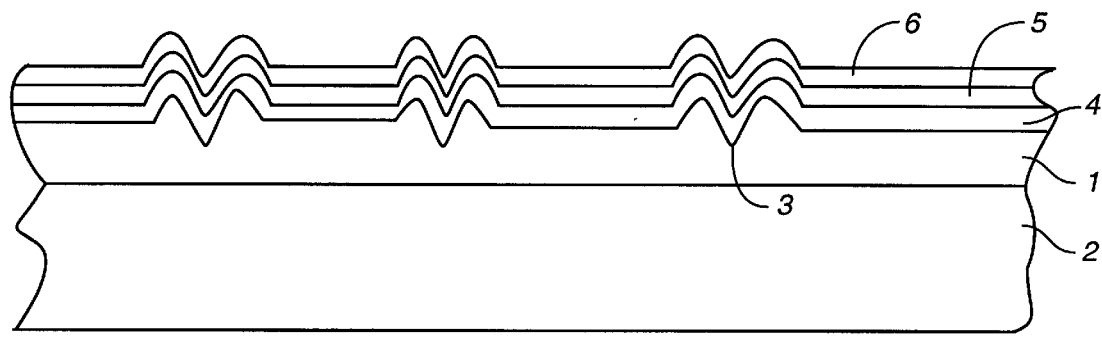
FIG._1
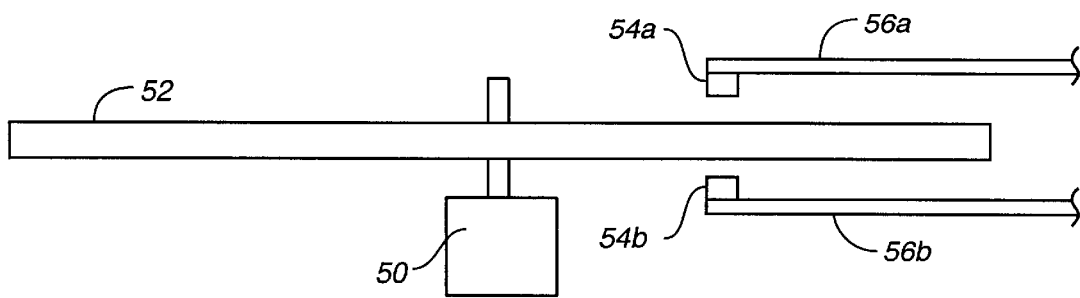
FIG._7

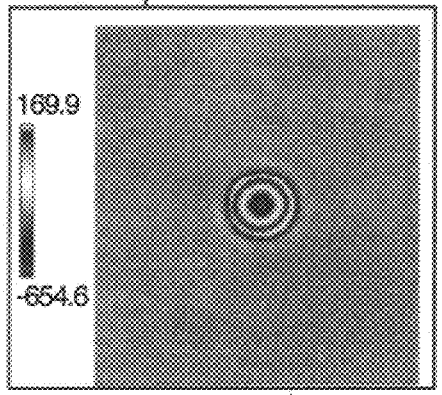
FIG._2A
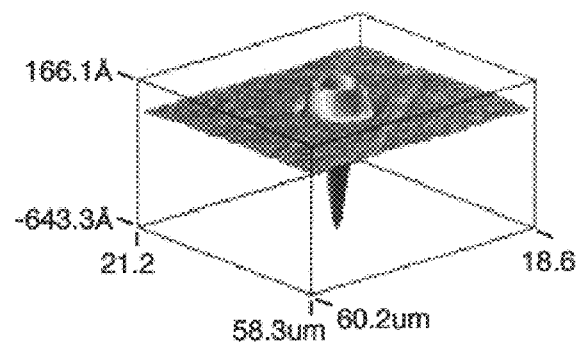
FIG._3A
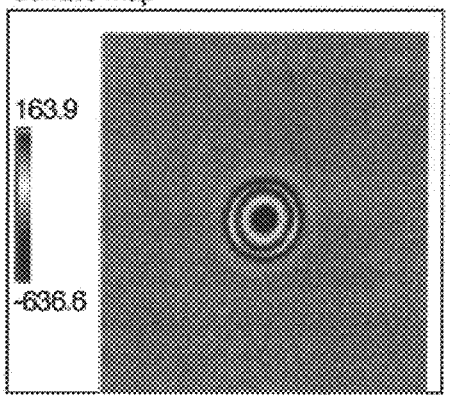
FIG._2B
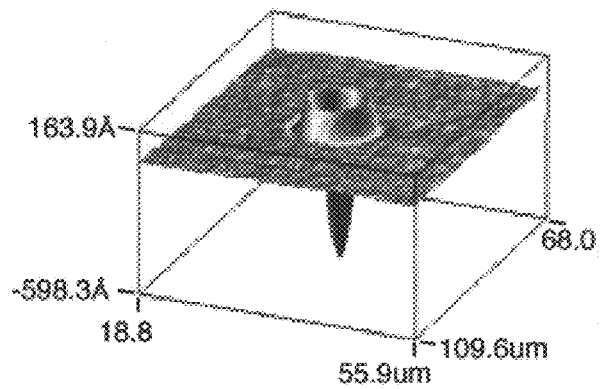
FIG._3B
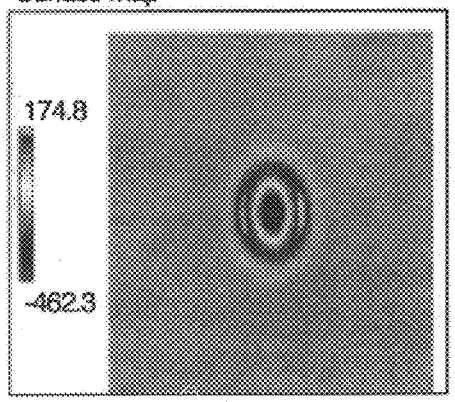
FIG._2C
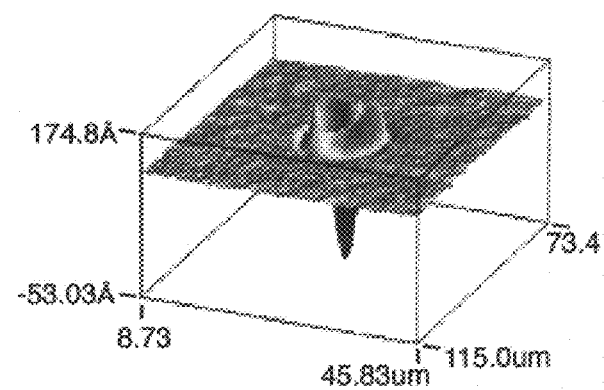
FIG._3C

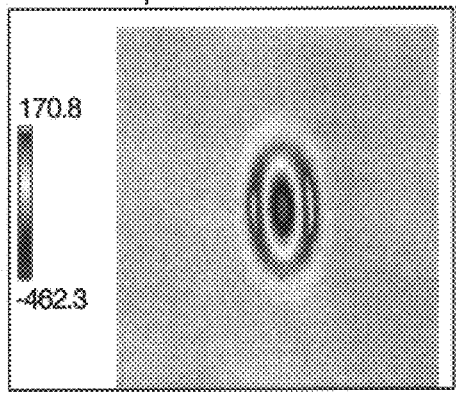
FIG._2D
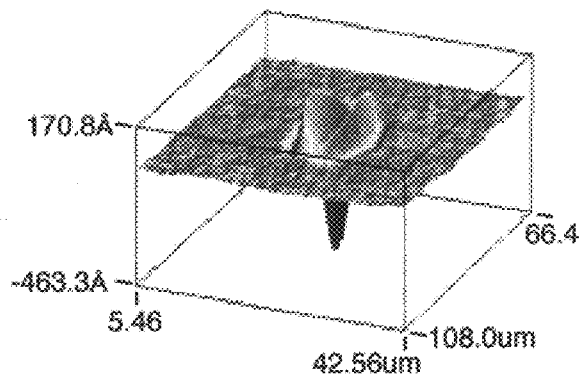
FIG._3D
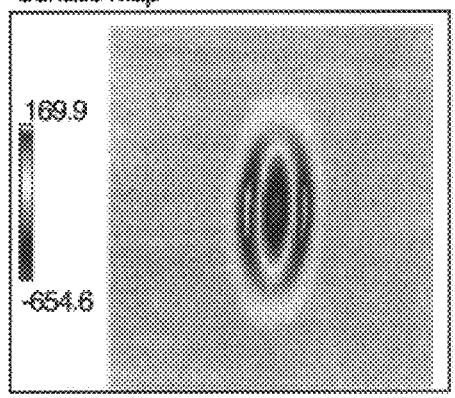
FIG._2E
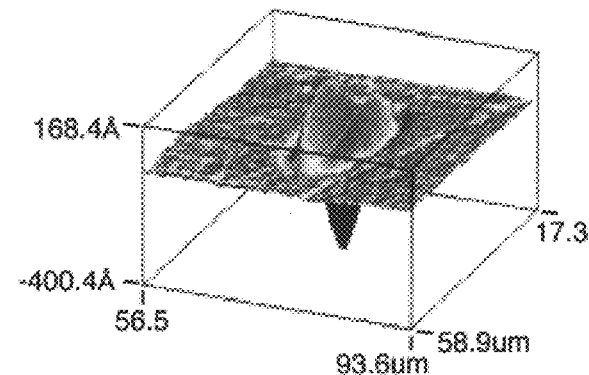
FIG._3E

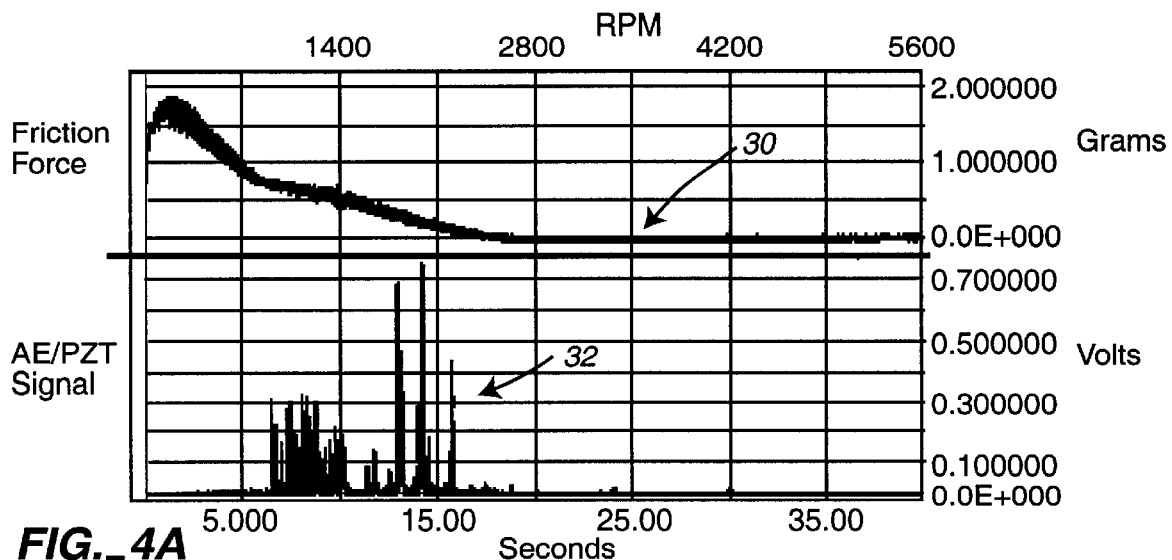
FIG._4A
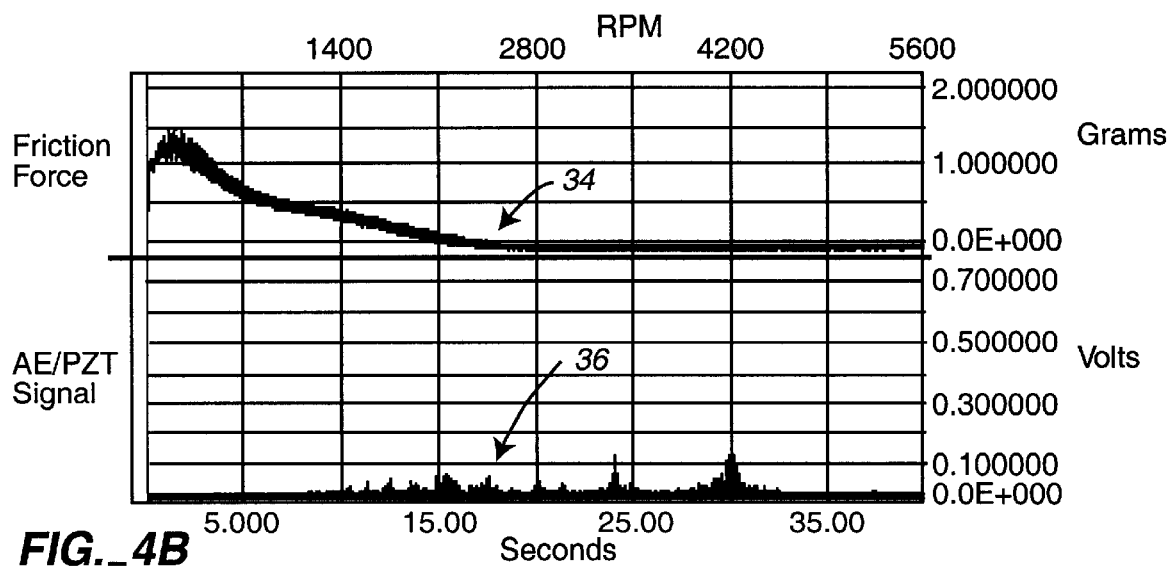
FIG._4B
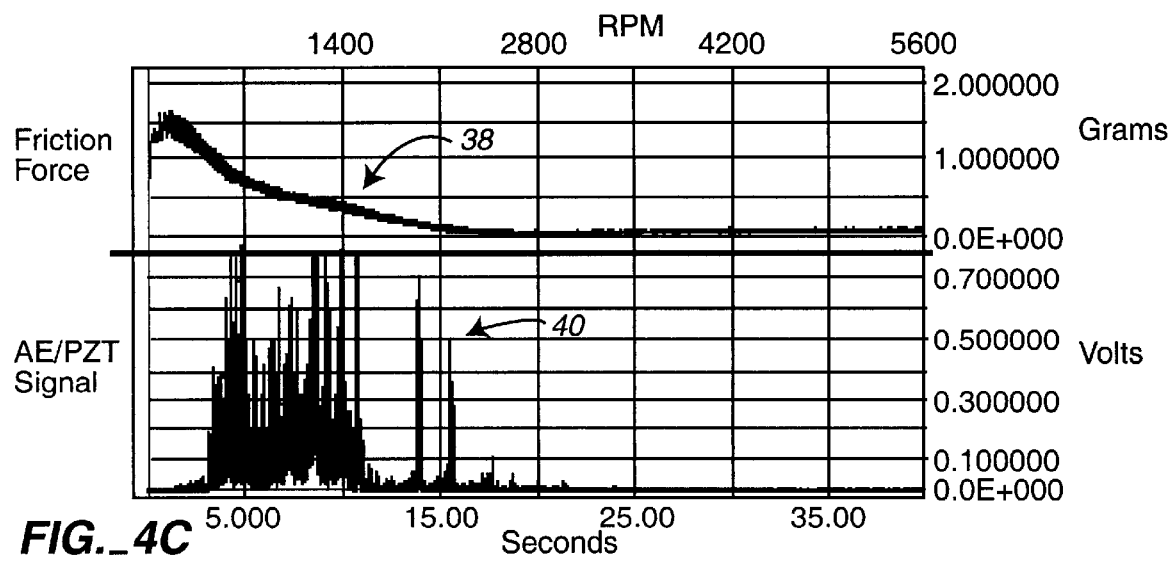
FIG._4C

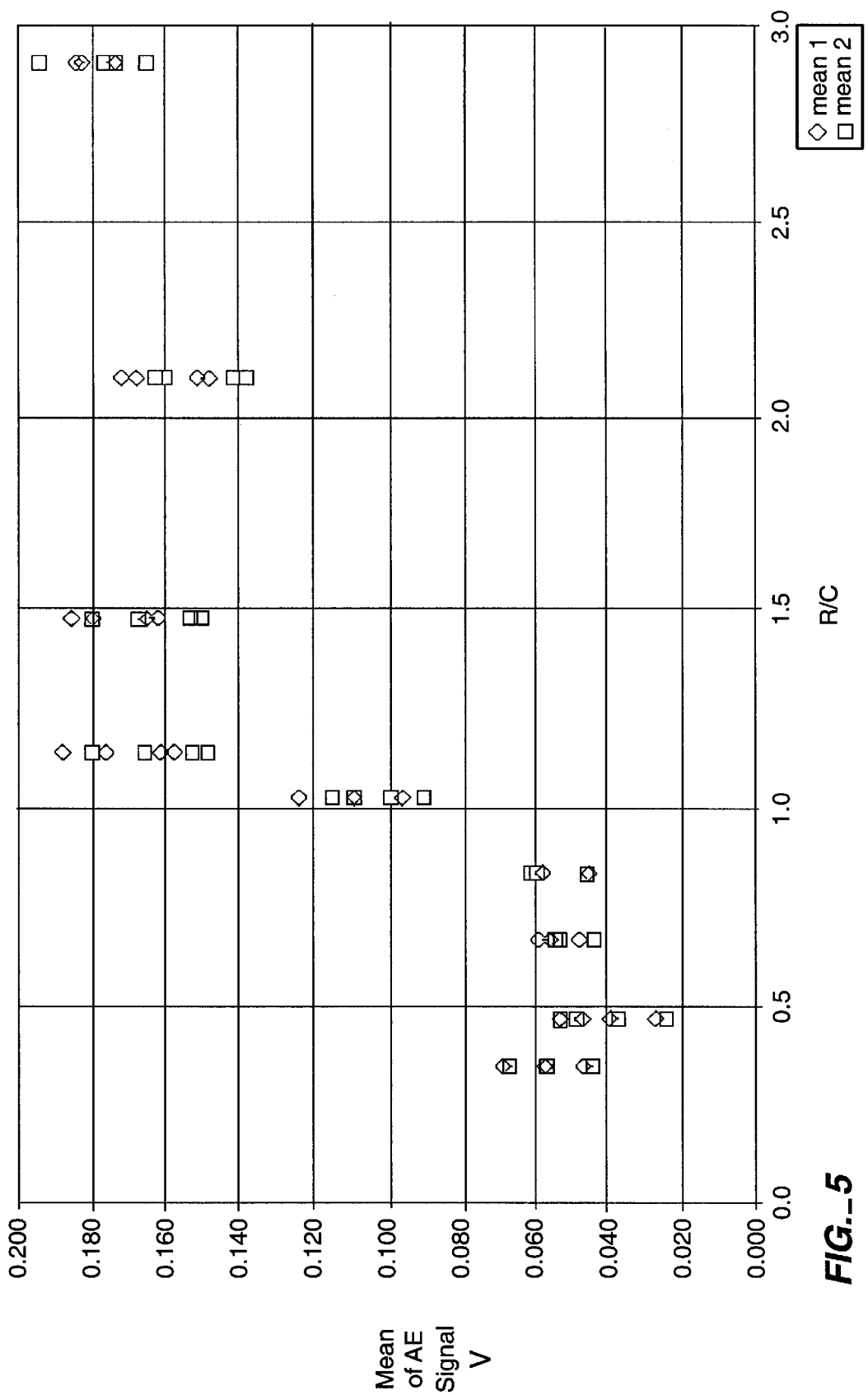
FIG._5

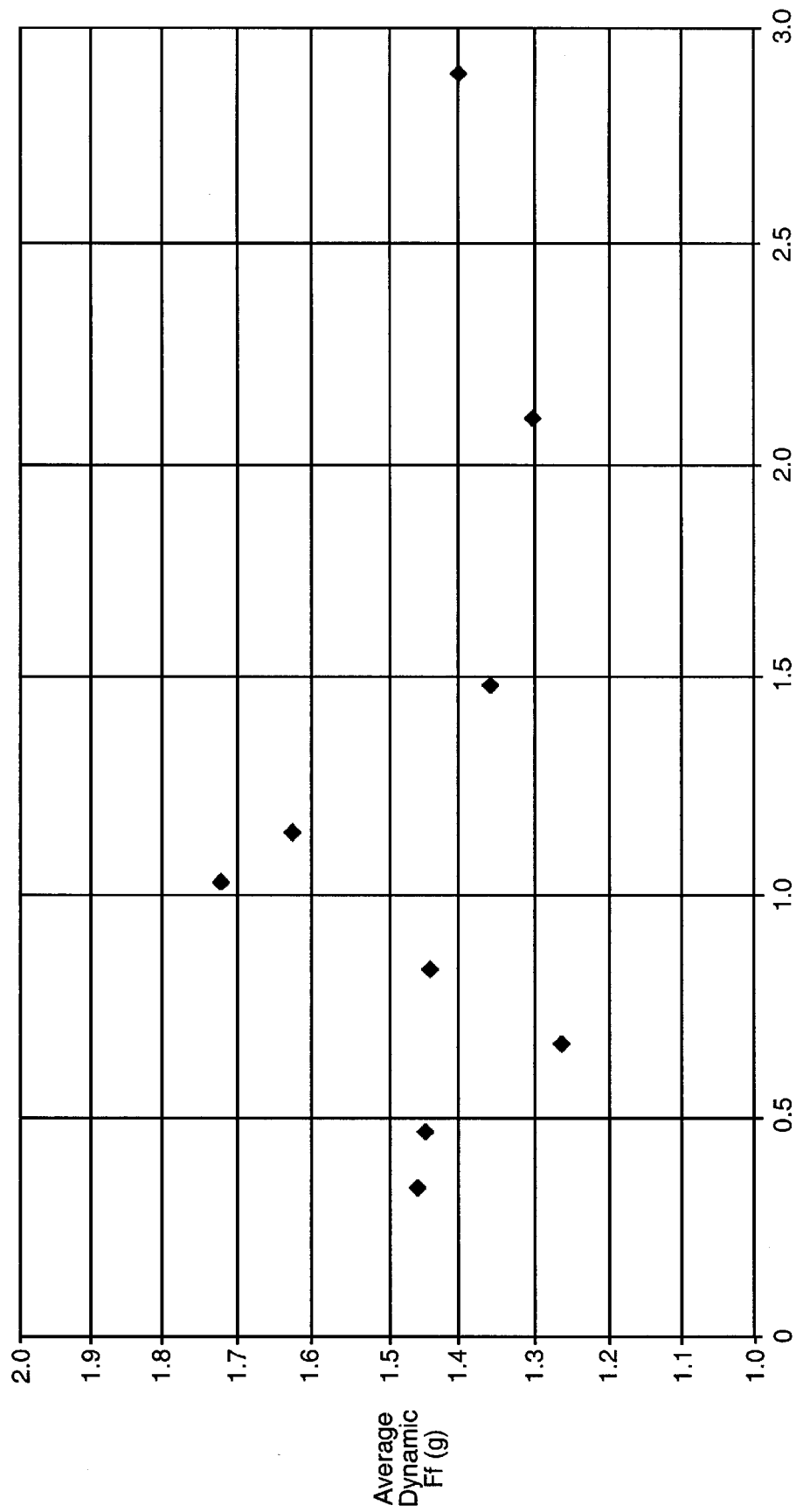
FIG._6

METHOD OF FORMING A MAGNETIC HARD DISK WITH ELLIPTICAL SHAPED LASER BUMPS

BACKGROUND OF THE INVENTION

This invention relates to magnetic disks, and in particular to textures formed on magnetic disks that induce a minimum amount of vibration of a read-write head while simultaneously reducing static and dynamic friction between the disk and the read-write head. This invention also relates to methods for texturing magnetic disks.

It is known in the art to manufacture magnetic disks using the following process.

1. A NiP layer 1 is electroless plated onto an Al alloy 2 (FIG. 1). (NiP layer 1 is hard, and protects the disk during collisions with a read-write head during use.)
2. NiP layer 1 is then polished.
3. NiP layer 1 is textured by forming bumps 3 so that the resulting disk has a rough surface. This texture minimizes static and dynamic friction between a read-write head and the resulting disk during use. The texture can be placed either on the entire disk surface or on only a portion of the disk surface called a contact-start-stop, or "CSS" zone. (The CSS zone is where the read-write head rests against the disk when the disk is not in use.)
4. An undercoat 4 (e.g. NiP or Cr), a magnetic Co alloy 5, and a protective film 6 (e.g. hydrogenated carbon or zirconia) are then sputtered onto NiP layer 1 in that order.
5. A lubricant layer is applied to protective film 6.

One technique for texturing the NiP layer is to apply laser pulses thereto to form "ridge-shaped" texture bumps. Such bumps comprise a circular ridge having a depression in the middle. One such laser bump is shown in plan view in FIG. 2A and in perspective view in FIG. 3A. Laser texturing is discussed, for example, in U.S. Pat. No. 5,062,021, issued to Ranjan. Laser texture bumps should be large enough to decrease the friction force between the head and disk, and at the same time small enough to allow a low flying and glide height at which no contact occurs between the head and the disk.

There is a general trend in the industry to reduce the height of laser bumps on magnetic disks. This height reduction permits the read-write head to fly closer to the magnetic disk. The size of the laser bump determines its mechanical effect on the head-disk interface. The height and diameter of a laser bump can be independently controlled during texturing. If the bump height is reduced without reducing the bump diameter, the bump will have a larger radius of curvature, which causes a greater head-disk contact area (and therefore increased stiction and friction). Accordingly, when one reduces the bump height (to permit a lower flying height), it is also desirable to reduce the bump diameter (to reduce effective contact area between the head and disk).

When a read-write head takes off and lands on a magnetic disk, mechanical interaction between the head and disk causes the head to vibrate. Such vibrations can be measured with a piezoelectric transducer, which provides an output signal called an acoustic emission ("AE") signal. In recent years, there has been interest in reducing such vibrations to enhance durability and reliability of the disk drive.

SUMMARY

We have discovered that by modifying the shape of a texture bump on a magnetic disk, we can reduce vibration of a read-write head caused by head-disk mechanical contact. In particular, we have discovered that by making elliptical texture bumps on a magnetic disk, we can reduce such vibrations. We have also discovered that making texture bumps elliptical reduces friction between the read-write head and the disk. In one embodiment, the elliptical bumps have their major axis parallel to the circumferential direction of the disk. The elliptical bumps are typically formed by modifying the shape of the laser beam used to texture the substrate. The elliptical bumps typically comprise an elliptical ridge surrounding a depression.

BRIEF DESCRIPTION OF THE DRAWINGS

FIG. 1 illustrates in cross section a prior art magnetic disk including texture bumps.

FIGS. 2A, 2B, 2C, 2D and 2E are plan views of ridge-shaped texture bumps of various aspect ratios.

FIGS. 3A, 3B, 3C, 3D and 3E are perspective views of the ridge shaped bumps of FIGS. 2A to 2E.

FIG. 4A illustrates the friction force between a magnetic disk having circular ridge-shaped bumps and a read-write head. FIG. 4A also shows an acoustic emission signal caused by vibration induced in the read-write head by the circular ridge-shaped bumps.

FIG. 4B illustrates the friction force between a magnetic disk having elliptical ridge-shaped bumps on a magnetic disk and a read-write head in which the major axis of the ellipse is in the circumferential direction of the disk. FIG. 4B also shows an acoustic emission signal caused by vibration induced in the read-write head by the elliptical ridge-shaped bumps.

FIG. 4C illustrates the friction force between a magnetic disk having elliptical ridge-shaped bumps on a magnetic disk and a read-write head in which the minor elliptical axis is in the circumferential direction of the disk. FIG. 4C also shows an acoustic emission signal caused by vibration induced in the read-write head by the elliptical ridge-shaped bumps.

FIG. 5 illustrates the relation between texture bump aspect ratio and an acoustic emission signal provided by a piezoelectric transducer coupled to a read-write head.

FIG. 6 illustrates the relation between friction force and texture bump aspect ratio for the friction between a read-write head and a textured magnetic disk.

FIG. 7 illustrates a disk drive comprising a disk having elliptical texture bumps formed thereon.

DETAILED DESCRIPTION

In one embodiment, a magnetic disk in accordance with the invention is manufactured by electroless plating an Al alloy substrate with NiP, polishing the NiP, and texturing the NiP by providing elliptical texture bumps on at least a portion of the NiP. In one embodiment, the elliptical bumps are formed by applying radiation, e.g. in the form of laser pulses, to the NiP. For example, a laser such as model no. V80-106Q, manufactured by SpectraPhysics corporation of Mountain View, Calif., can be used to form the elliptical texture bumps. Such a laser can provide laser pulses at a frequency of 110 KHz, with a 80 ns pulse duration and 10 mJ/pulse. However, other kinds of lasers and laser pulse parameters can also be used.

The shape of the laser pulse can be modified by any of several methods. In one embodiment, the pulse shape is modified by interposing a cylindrical lens between the laser and NiP-coated substrate. In another embodiment, the pulse shape is modified by passing the laser pulses through a rectangular (or other oblong-shaped) iris. The beam diameter can be varied from 1 mm to 4 mm, depending on the choice of lens and/or iris. (The size of the laser beam can then be further reduced by passing through a lens which focuses the beam onto a small spot on the NiP layer.)

The laser beam is thus modified to have an elliptical cross section. Because of the manner in which the laser beam is modified, the laser power furthest from the center of the ellipse is spread over a larger area than the laser power closest to the center of the ellipse. As a result, the highest laser intensity is provided closest to the ellipse center. The elliptical ridge formed on the NiP layer by the laser has its highest points closest to the ellipse center and the lowest points furthest from the ellipse center. The greater the ellipse eccentricity (or aspect ratio), the larger the difference between the highest and lowest points of the bump ridge. The area of contact between the texture bumps and a read-write head varies dramatically as the laser bump is made elliptical. As explained below, this strongly affects the mechanical interaction between the head and disk.

In one embodiment, after texturing, an underlayer (e.g. Cr or NiP), a magnetic Co alloy film, and a protective overcoat are sputtered onto the disk in that order. A lubricant layer is then applied to the magnetic disk. The major axis of the ridge shaped bumps is typically parallel to the circumferential direction of the disk.

FIGS. 2A and 3A show a circular ridge shaped bump in a substrate formed in accordance with the prior art in plan and perspective views, respectively. FIGS. 2B to 2E and 3B to 3E illustrate elliptical ridge shaped bumps of increasing eccentricities in accordance with our invention. FIGS. 2 and 3 show that the greater the ellipse eccentricity, the greater the variation in the height of the ridge as one moves from a point on the ridge closest to the ellipse center to a point furthest from the ellipse center.

In one embodiment of the invention, the maximum height of the texture bump is between 5 nm and 35 nm, depending on glide height requirements. The major diameter of the bump is between 6 $\mu$m and 36 $\mu$m, and the minor diameter of the bump is between 2 $\mu$m and 12 $\mu$m. In one embodiment, the ratio of the major diameter to minor diameter is between 1.1 and 3. However, other bump sizes and aspect ratios can also be used. As discussed in greater detail below, by using an elliptical texture bump, we can reduce vibration of a read-write head as the head takes off and lands from the disk. This reduction occurs, for example, when the ratio of the major diameter to minor diameter is about 1.2 or greater. We are also able to reduce friction between the read-write head and the disk. This effect can occur, for example, when the ratio of the major diameter to minor diameter of the elliptical bump is about 1.5 or greater. We believe that these beneficial effects are caused, in part, by changes in air flow over the bumps when the disk rotates during use. These effects may also be caused, in part, by the fact that the portions of the bump ridge close to the center of the ellipse are somewhat higher than the portions of the bump ridge further from the center of the ellipse. This changes the area of mechanical contact, and therefore the nature of the mechanical interaction, between the read-write head and the texture bump. Some of the effects of our invention can be seen with reference to FIGS. 4A, 4B and 4C.

FIG. 4A illustrates the friction and stiction between a read-write head and a magnetic disk as the read-write head takes off from a resting position on the disk. The normal loading force on the read-write head was about 3 grams. The disk comprised circular ridge-shaped laser texture bumps formed in accordance with the prior art. The y axis of curve 30 of FIG. 4A shows the friction force (in grams) between the read-write head and the disk. The data of curve 30 was obtained by measuring the force between the read-write head and the disk as the disk was rotated from an initially resting position (at time 0) until the head "took off" (i.e. started flying over the magnetic disk). The x axis of FIG. 4A is in seconds.

Curve 32 illustrates the output signal from a piezoelectric transducer affixed to the slider suspension holder. (The slider is part of the read-write head.) This output signal provides a measure of vibration of the head. To disregard other sources of vibration from the slider body vibration, a high pass filter from about 500 kHz was used when the acoustic emission signal was recorded. The y axis of curve 32 is in units of volts. The x axis of curve 32 is in seconds. As can be seen, in the early stages of take-off, the piezoelectric transducer provides an output signal (sometimes called an acoustic emission signal) indicative of a large amount of head vibration.

Curve 34 of FIG. 4B also shows the friction force between a read-write head and a magnetic disk while the read-write head is taking off. However, the disk of FIG. 4B had elliptical texture bumps. (The aspect ratio, i.e. the ratio of the major diameter divided by the minor diameter, was about 1.5.) The major diameter of the elliptical bumps was oriented in the circumferential direction of the disk. Curve 36 of FIG. 4B shows the output signal of a piezoelectric transducer affixed to the read-write head. As can be seen, curve 34 shows that friction between the head and disk is less than the corresponding friction of the disk of curve 30. Of importance, curve 36 shows that the piezoelectric transducer affixed to the slider suspension holder provides a much smaller output signal than the disk of curve 32. In other words, curve 36 shows that the vibrations induced in the read-write head by elliptical bumps oriented in the circumferential direction of the disk are much smaller than the vibrations induced by circular bumps.

The data of FIG. 4C is similar to that of FIG. 4B, except that in the case of FIG. 4C, the elliptical bumps were oriented such that their major diameter was in the radial direction of the disk. (The aspect ratio for the bumps of FIG. 4C was 1.5.) The friction between the head and disk was slightly less in FIG. 4C (see curve 38) than in FIG. 4A (see curve 30). However, the output signal from the piezoelectric transducer (curve 40) was greater than for curves 32 and 36.

The average of the maximum height of the bumps in FIGS. 4A to 4C were in the same range. However, because of the difference in shapes, the area of contact between the read-write head and the disk were different. From FIGS. 4A, 4B and 4C, it can be discerned that vibrations induced in a read-write head can be reduced by providing elliptical texture bumps on the disk that are oriented such that their major axes are oriented in the circumferential direction.

FIG. 5 illustrates the relation between ellipse aspect ratio and the acoustic emission signal provided by a piezoelectric transducer on a read write head for a number of different heads and disks. The x axis in FIG. 5 is r/c, i.e. the length of the diameter of the ellipse in the radial direction divided by the length of the diameter of the ellipse in the circumferential direction. In other words, for a r/c value less than one, the major axis of the ellipse was oriented in the circumferential direction, whereas for a r/c value greater than one, the major axis of the ellipse was oriented in the radial direction. FIG. 5 again highlights the fact that elliptical laser bumps having a major axis oriented in the circumferential direction exhibit reduced acoustic emission signals and therefore reduced vibration compared to circular ridge bumps or elliptical bumps having their major axis in the radial direction.

We are not certain why the elliptical bumps oriented in the circumferential direction reduce acoustic emission signals. One reason might be that the elliptical bumps oriented in the circumferential direction allow air to flow between the ridges, which increases the damping factor of the air bearing formed between the rail and the disk surface and reduces the pressure buildups at the bumps. This additional damping can suppress the vibration of the head in its pitch direction.

FIG. 6 illustrates the relation between the ellipse aspect ratio and friction between a read-write head and a magnetic disk during take-off of the read-write head. As can be seen, for texture bumps having an aspect ratio close to 1 (i.e. close to being circular), the friction coefficient is at a maximum (slightly greater than 1.7 grams). However, for aspect ratios other than 1, the friction force is substantially less, e.g. less than about 1.5 grams. Accordingly, FIG. 6 shows that elliptical bumps reduce friction between the read-write head and the disk.

A disk constructed in accordance with our invention is typically incorporated into a disk drive. Such a disk drive comprises a motor 50 (FIG. 7) for rotating a disk 52 having elliptical texture bumps and a pair of read-write heads 54*a*, 54*b* held by actuator arms 56*a*, 56*b*. Actuator arms 56*a*, 56*b* hold heads 54*a*, 54*b* over but in proximity to disk 52 so that they can read data from and write data to disk 52. Actuator arms 56*a*, 56*b* are coupled to an actuator for moving arms 56*a*, 56*b* and heads 54*a*, 54*b* over selected tracks of disk 52.

While the invention has been described with respect to specific embodiments, those skilled in the art will appreciate that modifications can be made in form and detail without departing from the spirit and scope of the invention. For example, different types of lasers, and different laser pulse parameters can be used to texture a substrate in accordance with our invention. Laser bumps with different eccentricities can be formed. In one embodiment, the ellipse aspect ratio is between 1.1 and 3, and in another embodiment, between 1.2 and 1.5 The texture bumps can be formed either over the entire disk surface or over only a portion of the disk surface. In one embodiment, the texture bumps in that portion can have a consistent size and shape.

As mentioned above, the laser beam can be altered by passing the beam through a lens or iris that causes the resulting bump to be elliptical. In other embodiments, the laser beam can strike the substrate at an angle which causes the resulting laser bump to be elliptical.

Instead of laser texturing an NiP layer on a substrate, the substrate itself, or other layers on a magnetic disk (including the magnetic layer) can be textured in accordance with our invention. Also, different kinds of substrates, e.g. glass or glass ceramic substrates can be used. One can deposit a metallic layer on such glass or glass ceramic substrates and texture that metallic layer. Alternatively, one can texture the substrate itself.

In addition, magnetic disks with different types of materials deposited thereon can be textured in accordance with our invention. For example, instead of disks comprising a Co magnetic alloy, disks comprising a Fe magnetic alloy can be used. Disks with different types of underlayers (or no underlayer) can be used, and disks with different kinds of protective overcoats (or no overcoat) can be used. Accordingly, all such modifications come within our invention.

We claim:

1. Method for forming a magnetic disk comprising texture bumps, said method comprising:
   applying a set of laser pulses to a disk-shaped substrate, wherein said laser pulses interact with said substrate to form a set of elliptical texture bumps on said substrate for reducing friction exhibited by said magnetic disk, said elliptical texture bumps being oriented such that they are longer in the circumferential direction of the substrate than the radial direction of the substrate, wherein each of said elliptical texture bumps is formed by a single laser pulse;
   applying a magnetic layer to said substrate to thereby form a magnetic disk for placement in a magnetic disk drive.

2. Method of claim 1 wherein said elliptical texture bumps are oriented such that their major axes are substantially parallel to the circumferential direction of the magnetic disk.

3. Method of claim 1 further comprising providing an underlayer over said substrate before applying said magnetic layer to said substrate, whereby said magnetic layer is formed on said underlayer.

4. Method of claim 1 wherein the elliptical shape of said texture bumps and the orientation of said texture bumps reduce the vibration that said texture bumps cause in a read-write head used in conjunction with said magnetic disk.

5. Method of claim 1 wherein said elliptical texture bumps have an aspect ratio less than 0.9.

6. Method of claim 5 wherein said aspect ratio is greater than 0.1.

7. Method of claim 1 wherein said texture bumps have an aspect ratio greater than 1.1.

8. Method of claim 7 wherein said aspect ratio is less than 10.

9. Method of claim 1 wherein the maximum height of the texture bumps is between 5 nm and 35 nm.

10. Method of claim 1 wherein the major diameter of the texture bumps is between 2.2 $\mu$m and 36 $\mu$m.

11. Method of claim 1 wherein the minor diameter of the texture bumps is between 2 $\mu$m and 12 $\mu$m.

12. Method of claim 1 further comprising forming an underlayer between said substrate and said magnetic layer.

13. Method of claim 12 further comprising forming a protective layer over said magnetic layer.

14. Method of claim 1 wherein said substrate comprises aluminum plated with an NiP layer, and wherein said elliptical bumps are formed in said NiP layer during said applying of said laser pulses.

15. Method of claim 1 wherein said elliptical texture bumps have an aspect ratio between 1.1 and 3.

16. Method of claim 1 further comprising placing said magnetic disk in a magnetic disk drive.

17. Method of claim 1 wherein the friction reduced by said texture bumps comprises static friction.

18. Method of claim 1 wherein the friction reduced by said texture bumps comprises dynamic friction.

19. Method for forming a magnetic disk for use in a magnetic disk drive, said magnetic disk having elongated texture bumps for reducing the friction exhibited by said magnetic disk, said magnetic disk comprising a disk-shaped substrate, said method comprising applying laser pulses to said disk such that said laser pulses form elongated texture bumps, said elongated texture bumps being longer in the circumferential direction of said disk-shaped substrate than the radial direction of said disk-shaped substrate, wherein at the conclusion of said method, a magnetic layer is formed over said substrate.

20. Method of claim 19 wherein the elongated shape of the texture bumps is caused by the shape of the laser pulses and/or the angular orientation of the disk with respect to the line of travel of said laser pulses.

21. Method of claim 19 further comprising forming said magnetic layer over said substrate before applying said laser pulses.

22. Method of claim 19 further comprising forming said magnetic layer over said substrate after applying said laser pulses.

23. Method of claim 19 wherein said disk comprises an underlayer between said substrate and said magnetic layer.

24. Method of claim 19 wherein the friction reduced by said texture bumps comprises static friction.

25. Method of claim 19 wherein the friction reduced by said texture bumps comprises dynamic friction.

26. Method of claim 19 further comprising placing said disk in a disk drive.

27. Method of claim 19 wherein the elongated shape of said texture bumps and the orientation of said texture bumps reduce the vibration that said texture bumps cause in a read-write head used in conjunction with said magnetic disk.

28. Method of claim 19 wherein each of said texture bumps is formed by a single laser pulse.

29. Method of claim 19 wherein said texture bumps have a height less than 35 nm.

30. A method for forming a magnetic disk including texture bumps, said method comprising:

applying laser pulses to a disk-shaped substrate to form texture bumps for reducing friction exhibited by said magnetic disk, said method comprising the step of altering the shape of said laser beam so that said texture bumps are elliptical, said elliptical texture bumps being oriented such that they are longer in the circumferential direction of the substrate than the radial direction of the substrate; and applying a magnetic layer to said substrate to form a magnetic disk for placement in a magnetic disk drive.

31. Method of claim 30 wherein said elliptical texture bumps have an aspect ratio between 1.1 and 3.

32. Method of claim 30 further comprising placing said magnetic disk in a magnetic disk drive.

33. Method of claim 30 wherein the friction reduced by said texture bumps comprises dynamic friction.

34. Method of claim 30 wherein the friction reduced by said texture bumps comprises static friction.

35. Method of claim 30 wherein the elliptical shape of said texture bumps and the orientation of said texture bumps reduce the vibration that said texture bumps cause in a read-write head used in conjunction with said magnetic disk.

36. Method of claim 30 further comprising providing an underlayer over said substrate before applying said magnetic layer to said substrate, whereby said magnetic layer is formed on said underlayer.

37. Method of claim 30 wherein said step of altering the shape of said laser beam is accomplished by passing said laser beam through a lens that alters the shape of said laser beam by making said laser beam more elliptical.

38. Method of claim 30 wherein said step of altering the shape of said laser beam is accomplished by passing said laser beam through an oblong iris.

39. Method of claim 30 wherein each texture bump is formed by a single laser pulse.

\* \* \* \* \*